(12) United States Patent
Mou et al.

(10) Patent No.: US 10,504,242 B2
(45) Date of Patent: Dec. 10, 2019

(54) METHOD AND DEVICE FOR CALIBRATING DUAL FISHEYE LENS PANORAMIC CAMERA, AND STORAGE MEDIUM AND TERMINAL THEREOF

(71) Applicant: Shanghai Xiaoyi Technology Co., Ltd., Shanghai (CN)

(72) Inventors: Junzhou Mou, Shanghai (CN); Zhenghua Liu, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/256,265

(22) Filed: Jan. 24, 2019

(65) Prior Publication Data

US 2019/0236805 A1    Aug. 1, 2019

(30) Foreign Application Priority Data

Jan. 26, 2018    (CN) .......................... 2018 1 0076056

(51) Int. Cl.
| | |
|---|---|
| H04N 17/00 | (2006.01) |
| G06T 7/80 | (2017.01) |
| G06K 9/32 | (2006.01) |
| G06K 9/62 | (2006.01) |
| G06T 3/00 | (2006.01) |

(52) U.S. Cl.
CPC .............. *G06T 7/80* (2017.01); *G06K 9/3216* (2013.01); *G06K 9/6211* (2013.01); *G06T 3/0018* (2013.01)

(58) Field of Classification Search
CPC .. H04N 13/246; H04N 13/232; H04N 17/002; H04N 17/00; H04N 5/23238; H04N 5/232; G06T 3/0018; G06T 7/80; G06T 7/85; G06K 9/3216; G06K 9/6211
USPC ................ 348/187, 180, 38, 36, 335, 222.1; 382/275, 100, 254, 154; 345/419, 178; 702/85, 94
See application file for complete search history.

(56) References Cited

U.S. PATENT DOCUMENTS

| | | | |
|---|---|---|---|
| 2011/0164108 A1* | 7/2011 | Bates ................. | H04N 5/23238 348/36 |
| 2012/0133780 A1* | 5/2012 | Zhang ................. | H04N 17/002 348/187 |

* cited by examiner

*Primary Examiner* — Sherrie Hsia
(74) *Attorney, Agent, or Firm* — Cantor Colburn LLP

(57) ABSTRACT

A dual fisheye lens calibration method includes: generating a first pair of fisheye images of two calibration chessboards located directly in front of two fisheye lenses and one or more random feature point calibration boards located in overlapping regions of the two fisheye lenses; adjusting positions of optical centers of the two fisheye lenses based on differences between projection coordinates of corner points on fisheye images and coordinates of images of the corner points on the first pair of fisheye images, to obtain optimal optical centers; generating a second pair of fisheye images of the calibration chessboards and random feature point calibration boards, based on the optimal optical points; generating a panoramic image based on the second pair of fisheye images; and adjusting distortion polynomial coefficients and extrinsic parameters of the two fisheye lenses based on a difference between panoramic-image coordinates of a matching feature point pair.

20 Claims, 6 Drawing Sheets

METHOD AND DEVICE FOR CALIBRATING DUAL FISHEYE LENS PANORAMIC CAMERA, AND STORAGE MEDIUM AND TERMINAL THEREOF

CROSS-REFERENCE TO RELATED APPLICATION

The disclosure claims the benefits of priority to Chinese Application No, 201810076056.3, filed on Jan. 26, 2018, which is incorporated herein by reference in its entirety.

FIELD OF TECHNOLOGY

The exemplary embodiments of the present disclosure relate to the field of image processing technology, and more particularly, to a method and device for calibrating a dual fisheye lens used in a panoramic camera, and a storage medium and terminal thereof.

BACKGROUND

A 360-degree panoramic camera typically includes a plurality of conventional lenses or a plurality of wide-angle camera lenses, which are used by the camera to perform synchronous acquisition of a 360-degree scene and generate a complete spherical projection image. Using a panoramic camera including two fisheye camera lenses can reduce the complexity of stitching algorithms and achieve rapid stitching. However, fisheye lenses may produce image distortions. It is therefore necessary to calibrate the fisheye lens when a fisheye lens is manufactured.

With currently available technology, intrinsic and extrinsic parameters of a fisheye lens are calibrated separately. When the intrinsic parameters are being calibrated, a calibration board covers the vast majority of the area on the image captured by the lenses, particularly at the edges. Therefore, a plurality of images must be acquired, and it is necessary to move the camera or calibration board. After images are obtained, the projection error between the image coordinates of recognition feature points on the image and the corresponding coordinates on a chessboard plane is calculated, and the error is set as an optimization target to perform iteration and optimize all the intrinsic and extrinsic parameters of the lenses. When the extrinsic parameters are being calibrated, calibration boards need to be set up in overlapping regions of the images captured by the lenses. Next, the extrinsic parameters of each lens in relation to the calibration board are respectively calculated, after which the extrinsic parameters between the lenses are calculated.

However, when intrinsic parameters are calibrated, the larger the coverage of a calibration board on an image, the better the calibration results. Therefore, the camera or calibration board needs to be moved as much as possible, resulting in cumbersome and time-consuming operations and low productivity. When extrinsic parameters are calibrated, the calibration board must be simultaneously covered by images captured by two lenses, which generally results in the calibration board having a smaller coverage area on the images, thereby introducing a relatively large error. Moreover, the intrinsic parameters and extrinsic parameters of a lens are calculated separately, and a valid assessment cannot be provided for the distortion curve of the intrinsic parameters along the edge of the angle of view (FOV), frequently resulting in suboptimal results for extrinsic parameter calibration and poor final stitching effect as well.

SUMMARY

The technical problem addressed by the exemplary embodiments of the present disclosure is how to increase the calibration accuracy for fisheye lenses.

In order to address the aforementioned technical problem, one exemplary embodiment of the present disclosure provides a method of calibrating a dual fisheye lens that includes two fisheye lenses. The method may include determining intrinsic parameters and extrinsic parameters to be calibrated, the intrinsic parameters including optical centers of the two fisheye lenses and distortion polynomial coefficients of the two fisheye lenses; generating, through the dual fisheye lens, a first pair of fisheye images of: two calibration chessboards located directly in front of the two fisheye lenses, respectively, and one or more random feature point calibration boards located in overlapping regions of the dual fisheye lenses, wherein each of the two calibration chessboards shows a plurality of corner points, and each of the one or more random feature point calibration boards shows a plurality of random feature points; adjusting positions of the optical centers based on differences between coordinates of projections of the corner points on fisheye images and coordinates of images of the corner points on the first pair of fisheye images, to obtain optimal optical centers of the two fisheye lenses; generating a second pair of fisheye images through the two fisheye lenses, respectively, based on the optimal optical points, wherein the second pair of fisheye images captures the two calibration chessboards and the one or more random feature point calibration hoards; generating a panoramic image based on the second pair of fisheye images; determining a matching feature point pair that are images of a same random feature point on the second pair of fisheye images, respectively; and adjusting values of the distortion polynomial coefficients and values of the extrinsic parameters based on a difference between panoramic-image coordinates of the matching feature point pair, to obtain optimal distortion polynomial coefficients and optimal extrinsic parameters. Here, the panoramic image may be obtained by mapping and stitching on the basis of the second pair of fisheye images.

In some embodiments, the step of adjusting the positions of the optical centers based on the differences between the coordinates of projections of the corner points on fisheye images and the coordinates of images of the corner points on the first pair of fisheye images may include: setting initial positions of the optical centers to be at centers of the first pair of fisheye images, respectively; and adjusting the positions of the optical centers iteratively based on difference values between the coordinates of the projections of the corner points on fisheye images and the coordinates of the images of the corner points on the first pair of fisheye images, until the difference values are reduced to a predetermined value or the adjusting reaches a predetermined number of iterations.

In some embodiments, said the step of adjusting positions of the optical centers based on differences between coordinates of projections of the corner points on fisheye images and the coordinates of images of the corner points on the first pair of fisheye images may further include: in a Levenberg-Marquardt algorithm, setting difference values between the coordinates of the projections of the corner points on the first pair of fisheye images and the coordinates of the images of the corner points on the first pair of fisheye images to be optimization targets, and setting the positions of the optical center to be optimization variables; and using the Levenberg-Marquardt algorithm to determine positions of the optimal optical centers.

In some embodiments, the step of adjusting the values of the distortion polynomial coefficients and the values of the extrinsic parameters based on the difference between the panoramic-image coordinates of the matching feature point pair may further include: matching the second pair of fisheye images to generate the panoramic image; detecting the random feature point in an overlapping region of the panoramic image and determining initial panoramic-image coordinates of the matching feature point pair; calculating fisheye-image coordinates of the matching feature point pair, based on the initial panoramic-image coordinates of the matching feature point pair; and performing an iteration including: calculating the panoramic-image coordinates of the matching feature point pair based on the fisheye-image coordinates of the matching feature point pair, and adjusting the values of the distortion polynomial coefficients and the values of the extrinsic parameters based on a first difference value of the panoramic-image coordinates of the matching feature point pair, until the first difference value is reduced to a first predetermined value or the iteration is performed for a first predetermined number of times, wherein initial values of the distortion polynomial coefficients used for the iteration are determined by fitting a preset design curve of the dual fisheye lens, and initial values of the extrinsic parameters are determined by based on an coordinate system associated with the dual fisheye lens and an coordinate system associated with a camera using the dual fisheye lens, the extrinsic parameters including a rotation matrix and a translation vector.

In some embodiments, prior to the detecting the random feature point in the overlapping region of the panoramic image and determining the initial panoramic-image coordinates of the matching feature point pair, the method may further include: detecting a pair of preset feature points in the overlapping region of the panoramic image and determining initial panoramic-image coordinates of the pair of preset feature points, the pair of preset feature points being separated by a preset distance on the one or more random feature point calibration board; calculating fisheye-image coordinates of the pair of preset feature points based on the initial panoramic-image coordinates of the pair of preset feature points; wherein the iteration further includes: calculating a first distance of the pair of preset feature points based on the fisheye-image coordinates of the pair of preset feature points, determining a second difference value of the first distance and the preset distance, and adjusting the values of the distortion polynomial coefficients and the values of the extrinsic parameters based on the first difference value and the second difference value, until a sum of the first difference value and the second difference value is reduced to a second predetermined value or the iteration is performed for a second predetermined number of times.

In some embodiments, the step of adjusting the values of the distortion polynomial coefficients and the values of the extrinsic parameters based on the difference between the panoramic-image coordinates of the matching feature point pair may further include: in a Levenberg-Marquardt algorithm, setting the sum of the first difference value and the second difference value to be an optimization target, and setting the values of the distortion polynomial coefficients and the values of the extrinsic parameters to be optimization variables; and using the Levenberg-Marquardt algorithm to determine the optimal distortion polynomial coefficients and the optimal extrinsic parameters.

In some embodiments, the step of adjusting the values of the distortion polynomial coefficients and the values of the extrinsic parameters based on the difference between the panoramic-image coordinates of the matching feature point pair may further include: based on the difference between the panoramic-image coordinates of the matching feature point pair, adding control points, within a preset angle range centered around a 90-degree angle of view of the dual fisheye lens, to a distortion curve of the dual fisheye lens and adjusting pixel values of the added control points; and determining the optimal distortion polynomial coefficients by fitting the distortion curve.

In order to address the aforementioned technical problem, one exemplary embodiment of the present disclosure further discloses a device for calibrating a dual fisheye lens that includes two fisheye lenses. The device may include a memory storing instructions, and a processor configured to execute the instructions to: determine intrinsic parameters and extrinsic parameters to be calibrated, the intrinsic parameters including optical centers of the two fisheye lenses and distortion polynomial coefficients of the two fisheye lenses; generate a first pair of fisheye images through the two fisheye lenses, respectively, wherein the first pair of images captures: two calibration chessboards located directly in front of the two fisheye lenses, respectively, and one or more random feature point calibration boards located in overlapping regions of the dual fisheye lenses, wherein each of the two calibration chessboards shows a plurality of corner points, and each of the one or more random feature point calibration boards shows a plurality of random feature points; adjust positions of the optical centers based on differences between coordinates of projections of the corner points on the first pair of fisheye images and coordinates of images of the corner points on the first pair of fisheye images, to obtain optimal optical centers of the two fisheye lenses; generate a second pair of fisheye images through the two fisheye lenses, respectively, based on the optimal optical points, wherein the second pair of fisheye images captures the two calibration chessboards and the one or more random feature point calibration boards; generate a panoramic image based on the second pair of fisheye images; determine a matching feature point pair that are images of a same random feature point on the second pair of fisheye images, respectively; and adjust values of the distortion polynomial coefficients and values of the extrinsic parameters based on a difference between coordinates of the matching feature point pair on the panoramic image, to obtain optimal distortion polynomial coefficients and optimal extrinsic parameters. Here, the panoramic image may be obtained by mapping and stitching on the basis of the second pair of fisheye images.

In order to address the aforementioned technical problem, one exemplary embodiment of the present disclosure may further disclose a non-transitory computer-readable medium storing instructions that, when executed by a processor, cause the processor to perform the aforementioned method of calibrating a dual fisheye lens.

In order to address the aforementioned technical problem, one exemplary embodiment of the present disclosure may further disclose a terminal including a storage device storing instructions that, when executed by a processor, cause the processor to perform the steps of the aforementioned method for calibrating a dual fisheye lens panoramic camera.

In comparison to currently available technology, the technical solution provided by the exemplary embodiments of the present disclosure has the following benefits.

In the technical solution provided by the exemplary embodiments of the present disclosure, when a first pair of fisheye images and a second pair of fisheye images capturing a calibration chessboard and a random feature point calibration board are being obtained, the calibration chessboards may be respectively located directly in front of the fisheye lenses, and the random feature point calibration boards may be respectively located in overlapping regions of the dual fisheye lenses. The calibration chessboards may only be used to calibrate intrinsic parameters, thus eliminating the need in the currently available technology to frequently move the calibration chessboards or camera, simplifying the operating procedures, and increasing ease of calibration. The random feature point calibration boards may be located in the overlapping regions of the dual fisheye lenses, so that the random feature point calibration boards cover a larger area on the fisheye images, thus ensuring calibration accuracy. Moreover, the requirements for the calibration boards when extrinsic parameters are being calibrated may be simplified, and feature points on the random feature point calibration boards may be fewer in number, which may reduce the computational load during the calibration process. Further, the technical solution provided by the exemplary embodiments of the present disclosure may first adjust the position of the optical centers using the difference between first projection coordinates of the corner points of the calibration chessboards on the first pair of fisheye images and corner point coordinates on the first pair of fisheye images. Then, optimal optical centers may be used to capture the second pair of fisheye images to simultaneously adjust the values of the distortion polynomial coefficients and the values of the extrinsic parameters. This may improve the calibration accuracy for the distortion polynomial coefficients along the edges of the images and may further prevent the extrinsic parameters from being affected when currently available technology cannot effectively assess the distortion polynomial coefficients, thus improving the calibration accuracy for fisheye lenses.

Further, the technical solution provided by the exemplary embodiments of the present disclosure may map the second pair of fisheye images to form the panoramic image. The random feature points in the overlapping regions of the panoramic image may be detected and the initial panoramic image coordinates of each random feature point's matching feature point pair on the second pair of fisheye images may be determined. The fisheye image coordinates of the matching feature point pair may be recalculated on the basis of the initial panoramic image coordinates of the matching feature point pair. Iteratively, the panoramic image coordinates may be calculated on the basis of the fisheye image coordinates of the matching feature point pair and the values of the distortion polynomial coefficients and the values of the extrinsic parameters may be adjusted on the basis of a second difference value of the panoramic image coordinates of the matching feature point pair, until the second difference value is minimized or the number of iterations reaches a second preset value. The technical solution provided by the exemplary embodiments of the present disclosure may update the values of the distortion polynomial coefficients and the values of the extrinsic parameters by means of the panoramic image formed from stitching and projection and the projection error of random feature points in the panoramic image. While ensuring the calibration accuracy for the distortion polynomial coefficients and extrinsic parameters, this technical solution may further ensure the stitching effect of the panoramic image.

It is to be understood that both the foregoing general description and the following detailed description are exemplary and explanatory only and are not restrictive of the disclosed embodiments, as claimed.

DETAILED DESCRIPTION OF

Figure 1:
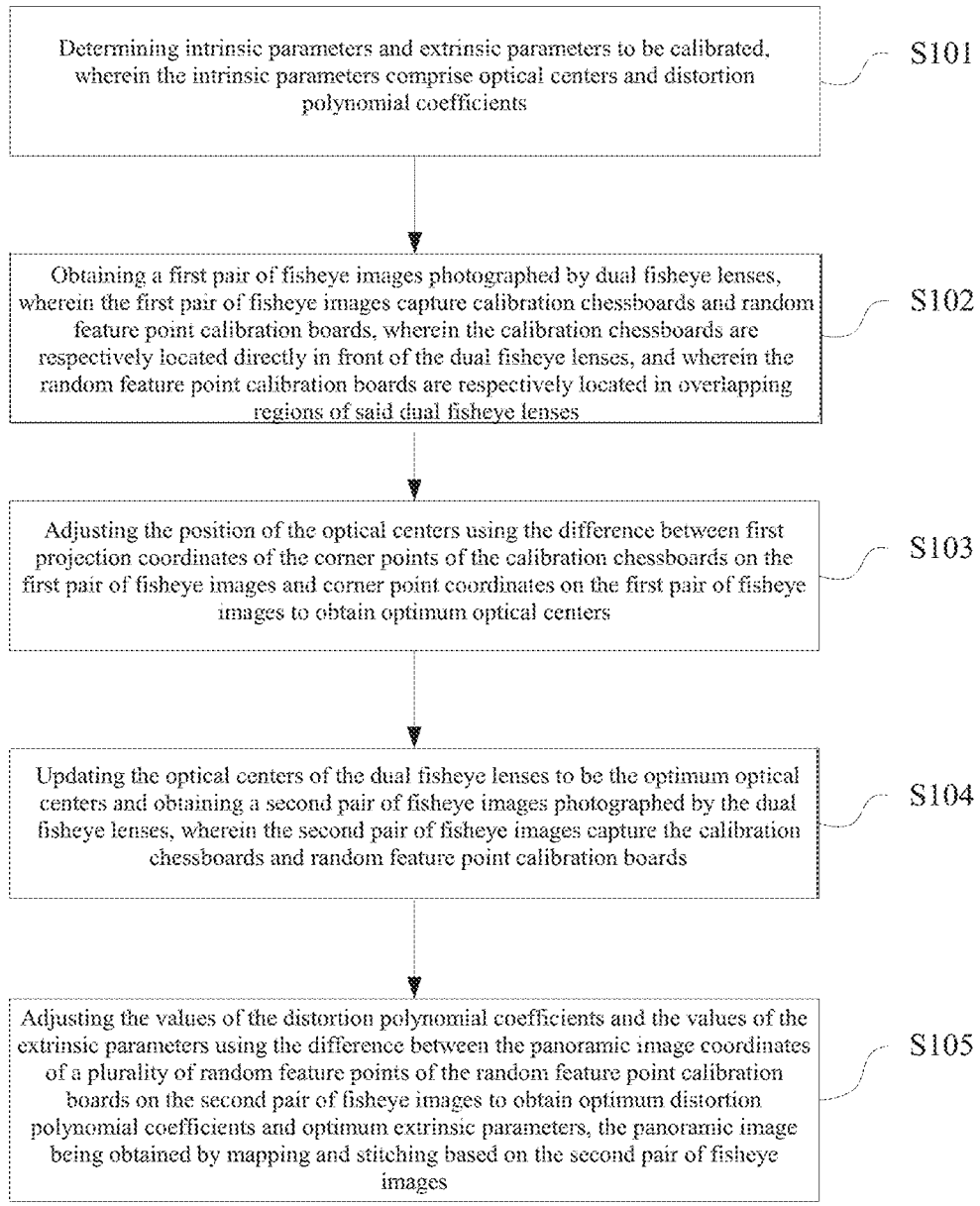
FIG. 1 is a flowchart of a method for calibrating a dual fisheye lens used in a panoramic camera, in accordance with an exemplary embodiment of the present disclosure.

As described above, when intrinsic parameters are being calibrated using currently available technology, the larger the coverage of a calibration board on an image, the better the calibration results. Therefore, the camera or calibration board needs to be moved as much as possible, resulting in cumbersome and time-consuming operations and low productivity. When extrinsic parameters are being calibrated, the calibration board must be simultaneously covered by images captured by two lenses, which generally results in the calibration board having a smaller coverage area on the images, thereby introducing a relatively large error. Moreover, the intrinsic parameters and extrinsic parameters of a lens are calculated separately, and a valid assessment cannot be provided for the distortion curve of the intrinsic parameters along the edge of the angle of view (AOV), frequently resulting in suboptimal results for extrinsic parameter calibration and poor final stitching effect as well.

In the technical solution provided by the exemplary embodiments of the present disclosure, when a first pair of fisheye images and a second pair of fisheye images capturing a calibration chessboard and a random feature point calibration board are being obtained, the calibration chessboards may be respectively located directly in front of the fisheye lenses, and the random feature point calibration boards may be respectively located in overlapping regions of the dual fisheye lenses. The calibration chessboards may only be used to calibrate the intrinsic parameter of optical center, thus eliminating the need in the currently available technology to frequently move the calibration chessboards or camera, simplifying the operating procedures, and increasing ease of calibration. The random feature point calibration boards may be located in the overlapping regions of the dual fisheye lenses, so that the random feature point calibration boards can cover a larger area on the fisheye images, thus ensuring calibration accuracy. Moreover, the requirements for the calibration boards when extrinsic parameters are being calibrated may be simplified, and feature points on the random feature point calibration boards may be fewer in number, which may reduce the computational load during the calibration process. Further, the technical solution provided by the exemplary embodiments of the present disclosure may first adjust the position of the optical centers using the difference between first projection coordinates of the corner points of the calibration chessboards on the first pair of fisheye images and corner point coordinates on the first pair of fisheye images. Then, optimal optical centers may be used to capture the second pair of fisheye images to simultaneously adjust the values of the distortion polynomial coefficients and the values of the extrinsic parameters. This may improve the calibration accuracy for the distortion polynomial coefficients along the edges of the images and may further prevent the extrinsic parameters from being affected when currently available technology cannot effectively assess the distortion polynomial coefficients, thus improving the calibration accuracy for fisheye lenses.

In order to make the aforementioned purposes, characteristics, and advantages of the exemplary embodiments of the present disclosure more evident and easier to understand, detailed descriptions of specific exemplary embodiments of the present disclosure are provided below with reference to the drawings attached.

FIG. 1 is a flowchart illustrating a method for calibrating a dual fisheye lens panoramic camera, in accordance with an exemplary embodiment of the present disclosure.

The method for calibrating a dual fisheye lens panoramic camera illustrated in FIG. 1 may be used to calibrate a dual fisheye lens panoramic camera. The method may include the following steps:

Step S101: determining intrinsic parameters and extrinsic parameters to be calibrated, wherein the intrinsic parameters include optical centers and distortion polynomial coefficients;

Step S102: obtaining a first pair of fisheye images photographed by dual fisheye lenses, wherein the first pair of fisheye images capture calibration chessboards and random feature point calibration boards, wherein the calibration chessboards are respectively located directly in front of the dual fisheye lenses, and wherein the random feature point calibration boards are respectively located in overlapping regions of the dual fisheye lenses;

Step S103: adjusting the position of the optical centers using the difference between first projection coordinates of the corner points of the calibration chessboards on the first pair of fisheye images and corner point coordinates on the first pair of fisheye images to obtain optimal optical centers;

Step S104: updating the optical centers of the dual fisheye lenses to be the optimal optical centers and obtaining a second pair of fisheye images photographed by the dual fisheye lenses, wherein the second pair of fisheye images capture the calibration chessboards and random feature point calibration boards; and Step S105: adjusting the values of the distortion polynomial coefficients and the values of the extrinsic parameters using the difference between the panoramic image coordinates of a plurality of random feature points of the random feature point calibration boards on the second pair of fisheye images to obtain optimal distortion polynomial coefficients and optimal extrinsic parameters, wherein the panoramic image is obtained by mapping and stitching based on the second pair of fisheye images.

In a specific embodiment of Step S101, the intrinsic parameters to be calibrated may be optical centers and distortion polynomial coefficients. Here, the optical center may be the point of intersection of the lens' optical axis and the camera's sensor plane. The distortion polynomial coefficients may represent a distortion curve. The angle between an incident ray and the lens' optical axis is referred to as the angle of incidence, denoted $\theta$. If the incident ray coincides with the lens optical axis, then $\theta$ is 0. The point of intersection between the incident ray and the sensor plane is denoted T, and the physical distance between T and the optical center is referred to as the image height, denoted $\rho$. The relationship between the angle of incidence $\theta$ and the image height $\rho$ is represented by a distortion curve. A distortion curve is usually expressed as a polynomial, i.e. $\rho = a0 + a1 \times \theta + a2 \times \theta^2 + a3 \times \theta^3 + \ldots + an \times \theta^n (n<10)$. When the physical size of an image sensor's pixels is known, the corresponding pixel size of the image height may be obtained by multiplying the image height p by a fixed constant (for example, if the image height is 2 mm and the physical size of the pixel is 1.55 µm, then the corresponding number of pixels is 2/0.00155=1290). Therefore, usually the physical image height $\rho$ may be converted to the pixel size image height f. Now the distortion polynomial can be transformed to $f = k0 + 51 \times \theta + k2 \times \theta^2 + k3 \times \theta^3 + \ldots + kn \times \theta^n$ (n<20), where K1, K2, . . . , Kn in the polynomial are the distortion polynomial coefficients.

The extrinsic parameters to be calibrated may be a rotation matrix and a translation vector of the lens coordinate system relative to the camera coordinate system. Specifically, the origin of the camera coordinate system may be the midpoint of the optical centers of the two fisheye lenses, and the origins of the two fisheye lens coordinate systems may respectively be located at the optical centers of the two lenses (for example, each may be located at the point of intersection between the optical axis and the lens surface).

In Step S102, the calibration chessboards may respectively be located directly in front of the dual fisheye lenses, and the random feature point calibration hoards may respectively be located in the overlapping regions of the dual fisheye lenses. Specifically, two calibration chessboards may be located directly in front of the two lenses, respectively; and three random feature point calibration hoards may be located to the left, right, and top of the camera, respectively. Three random feature point calibration boards may also be located to the left, right, and bottom of the camera, respectively; alternatively, four feature point calibration boards may be located to the left, right, top, and bottom of the camera, respectively.

Figure 2:
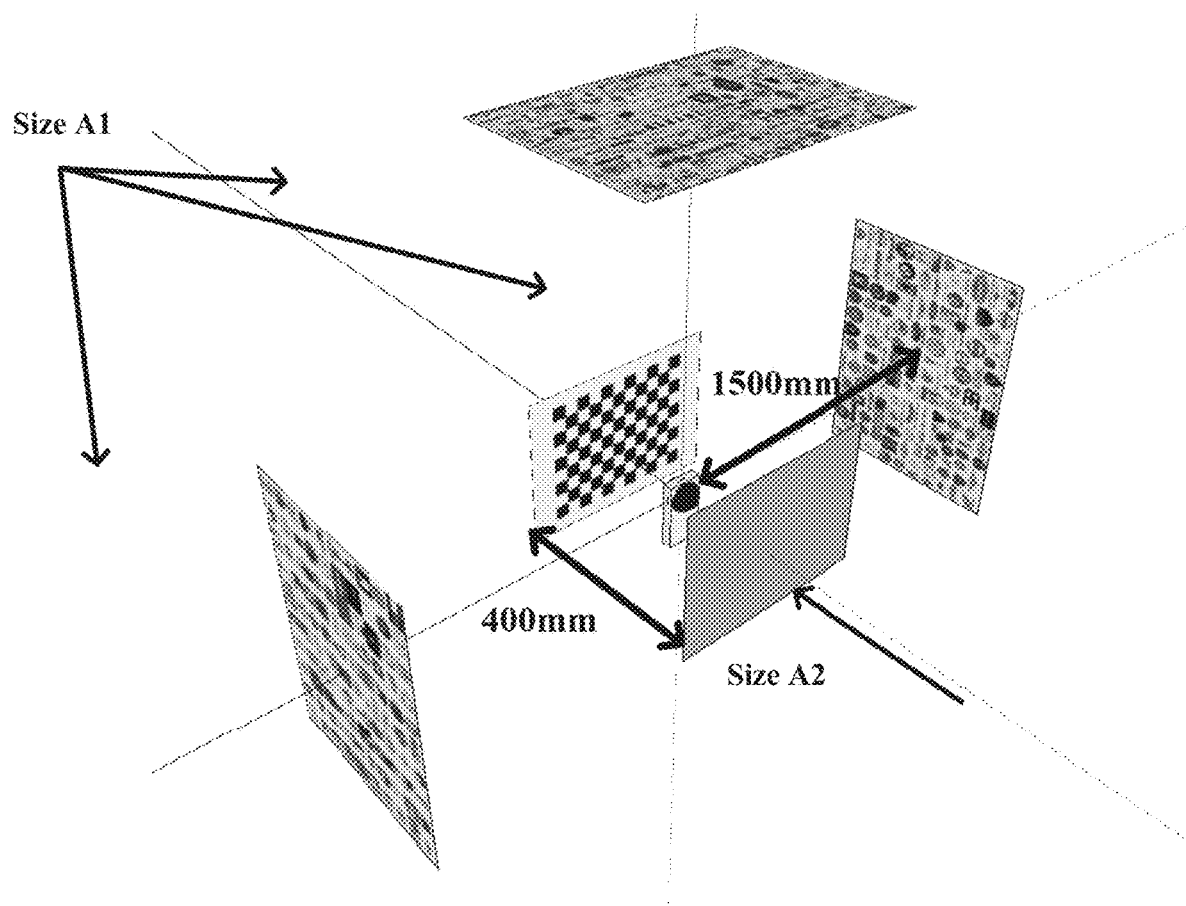
FIG. 2 is a schematic diagram illustrating the position of a dual-fisheye-lens panoramic camera in relation to calibration chessboards and random feature point calibration boards, in accordance with an exemplary embodiment of the present disclosure.

Referring to FIG. 2, two calibration chessboards may be located directly in front of the two lenses, respectively. The distance between the two calibration chessboards may be about 40 cm, and the distance between the calibration chessboards and the dual fisheye lenses may be about 20 cm. Three random feature point calibration boards may be located to the left, right, and top of the dual fisheye lens panoramic camera, respectively, with a distance of about 1.5 m between each random feature point calibration board and the dual fisheye lens panoramic camera.

Specifically, the size of the calibration chessboards used may be A2 (420 mm×594 mm), and the size of the random feature point calibration boards may be A1 (594 mm×841 mm).

Understandably, the distance between the calibration chessboards and the lenses and the distance between the random feature point calibration hoards and the camera may be adjusted according to the actual application environment. As such, no limitation in this respect is imposed by the exemplary embodiments of the present disclosure.

By undergoing Step S102, the first pair of fisheye images photographed by the dual fisheye lenses capturing the calibration chessboards and the random feature point calibration boards may be obtained. Then, in Step S103, the positions of the optical centers may be adjusted using the difference between the first projection coordinates of the corner points of the calibration chessboards on the first pair of fisheye images and corner point coordinates on the first pair of fisheye images.

In Step S103, calibration may be performed only on the intrinsic parameter of optical center to obtain the optimal optical centers. In such a situation, the optical centers may be adjusted simply by using the calibration chessboards located directly in front of the dual fisheye lenses. In other words, when adjusting the optical centers, it may not be necessary to take into account whether the calibration boards cover the peripheral regions of the images captured by the fisheye lenses, thus eliminating the need to frequently move the calibration boards or camera, simplifying the operating procedures, and increasing ease of calibration.

After Step S103 to determine optimal optical centers, in Step S104, the optical centers of the dual fisheye lenses may be configured to be the optimal optical centers, and a second pair of fisheye images may be photographed to capture the calibration chessboards and random feature point calibration boards.

The random feature point calibration boards may respectively be located in the overlapping regions of the dual fisheye lenses, and the random feature point calibration boards may have random feature points. Therefore, a given random feature point in the panoramic image obtained by stitching the second pair of fisheye images (i.e. two fisheye images) may have different coordinates. Then, in Step S105, the values of the distortion polynomial coefficients and the values of the extrinsic parameters may be adjusted using the difference between the coordinates of random feature points on the panoramic image to obtain the optimal distortion polynomial coefficients and optimal extrinsic parameters.

By now, calibration of the intrinsic parameters and the extrinsic parameters of the dual fisheye lens panoramic camera may be complete.

Persons having ordinary skill in the art may understand that any implementable approach, algorithm, etc. may be used to obtain the panoramic image from the second pair of fisheye images by mapping and stitching. Therefore, no limitation in this respect is imposed by the exemplary embodiments of the present disclosure.

In another exemplary embodiment of the present disclosure, Step S103 may include the step of adjusting the position of the optical centers iteratively based on a first difference value between the first projection coordinates and the corner point coordinates on the first pair of fisheye images, until the first difference value is minimized or the number of iterations reaches a first preset value. The initial position of the optical centers may be the center position in each of the first pair of fisheye images.

In this embodiment, the corner points of the calibration chessboards may have the first projection coordinates on the first pair of fisheye images. The calibration chessboards in the first pair of fisheye images may have corner points and corner point coordinates. The optimal optical center may be determined when the first difference value between the first projection coordinates and the corner point coordinates is minimized by iteratively changing the value of the optical center. Alternatively, if the first difference value cannot be minimized, the optimal optical center may be determined when the number of iterations reaches the first preset value.

In this embodiment, the first difference value may be minimized when, as the position of the optical center is adjusted, the first difference value decreases no further.

Specifically, the process of mapping a calibration chessboard from its chessboard coordinate system to the lens coordinate system of the fisheye images is described below. The conversion relationship between the chessboard coordinate system $(x_b, y_b, z_b)$ and the lens coordinate system $(x_c, y_c, z_c)$ may be: $[x_c, y_c, z_c]^T = R \times [x_b, y_b, z_b]^T + T$, where R is the 3×3 rotation matrix of the lens coordinate system relative to the chessboard coordinate system, and T is the 3×1 translation vector of the lens coordinate system relative to the chessboard coordinate system. R and T may be referred to as extrinsic parameters of the lens relative to the chessboard coordinate system.

The error between the fisheye image coordinates $(u_{fb}, v_{fb})$ on the fisheye image mapped from the coordinates $(x_b, y_b, z_b)$ of the corner points of the calibration chessboards in the chessboard coordinate system and the actual corner point coordinates $(u_{fd}, v_{fd})$ detected in the fisheye image may be the first difference value, which may also be referred to as the projection error. The magnitude of the first difference value may be affected by the intrinsic parameters of the lens. Thus, the optical center that causes the first difference value to be minimized may be the optimal optical center.

It should be noted that, one may refer to relevant algorithms provided by currently available technology for details about the process of obtaining the fisheye image coordinates $(u_{fb}, v_{fb})$ on the fisheye image by mapping from the coordinates $(x_b, y_b, z_b)$ of the corner points of the calibration chessboard in the chessboard coordinate system.

In another exemplary embodiment of the present disclosure, Step S103 may include the steps of setting the difference value between the first projection coordinates and the corner point coordinates on the first pair of fisheye images to be an optimization target, setting the position of the optical center to be an optimization variable, and using the Levenberg-Marquardt algorithm to determine the optimal optical center.

In this embodiment, through the configuration of the optimization target and optimization variable, the optimal optical center may be calculated using the Levenberg-Marquardt algorithm. When the Levenberg-Marquardt algorithm is used, the partial derivative function of the optimization target (which may also be referred to as the objective function) with respect to the optimization variable may not need to be explicitly indicated; rather, the computational load may be reduced through approximation by finite difference.

Specifically, the error between the fisheye image coordinates $(u_{fb}, v_{fb})$ on the fisheye image mapped from the coordinates $(x_b, y_b, z_b)$ of the corner points of the calibration chessboards in the chessboard coordinate system and the actual corner point coordinates $(u_{fd}, v_{fd})$ of the corner points detected in the fisheye image may be the optimization target for the optical center calibration process. The optimization variable may be the optical center coordinates $(c_x, c_y)$.

In this embodiment, change in the objective function may be observed as small changes are made to the optimization variable in order to approximate the partial derivative and determine the direction and size of change to the optimization variable. An exemplary process of performing optimization using the Levenberg-Marquardt algorithm is detailed below:

Step "a", setting the initial values of the optical center coordinates $(c_x, c_y)$ to be one half the height and width of the fisheye image;

Step "b", calculating the fisheye image coordinates ($u_{fb}$, $v_{fb}$) on the fisheye image projected from the corner point coordinates of the calibration chessboards in the chessboard coordinate system, calculating a first error $$\sum_{i}^{n} \sqrt{((u_{fd}^{i} - u_{fb}^{i})^2 + (v_{fd}^{i} - v_{fb}^{i})^2)}$$

between the fisheye image coordinates ($u_{fb}$, $v_{fb}$) and the corner point coordinates ($u_{fd}$, $v_{fd}$) of the corner points on the fisheye image, n being the number of corner points on the calibration chessboard.

Step "c", changing the values of the optical center coordinates ($c_x$, $c_y$) and repeating Step "b" to determine the size and direction of change that needs to be made to the optical center coordinates ($c_x$, $c_y$); and Step "d", iteratively executing Step "b" and Step "c" until the first error decreases no further or the number of iterations reaches the first preset value.

Figure 3:
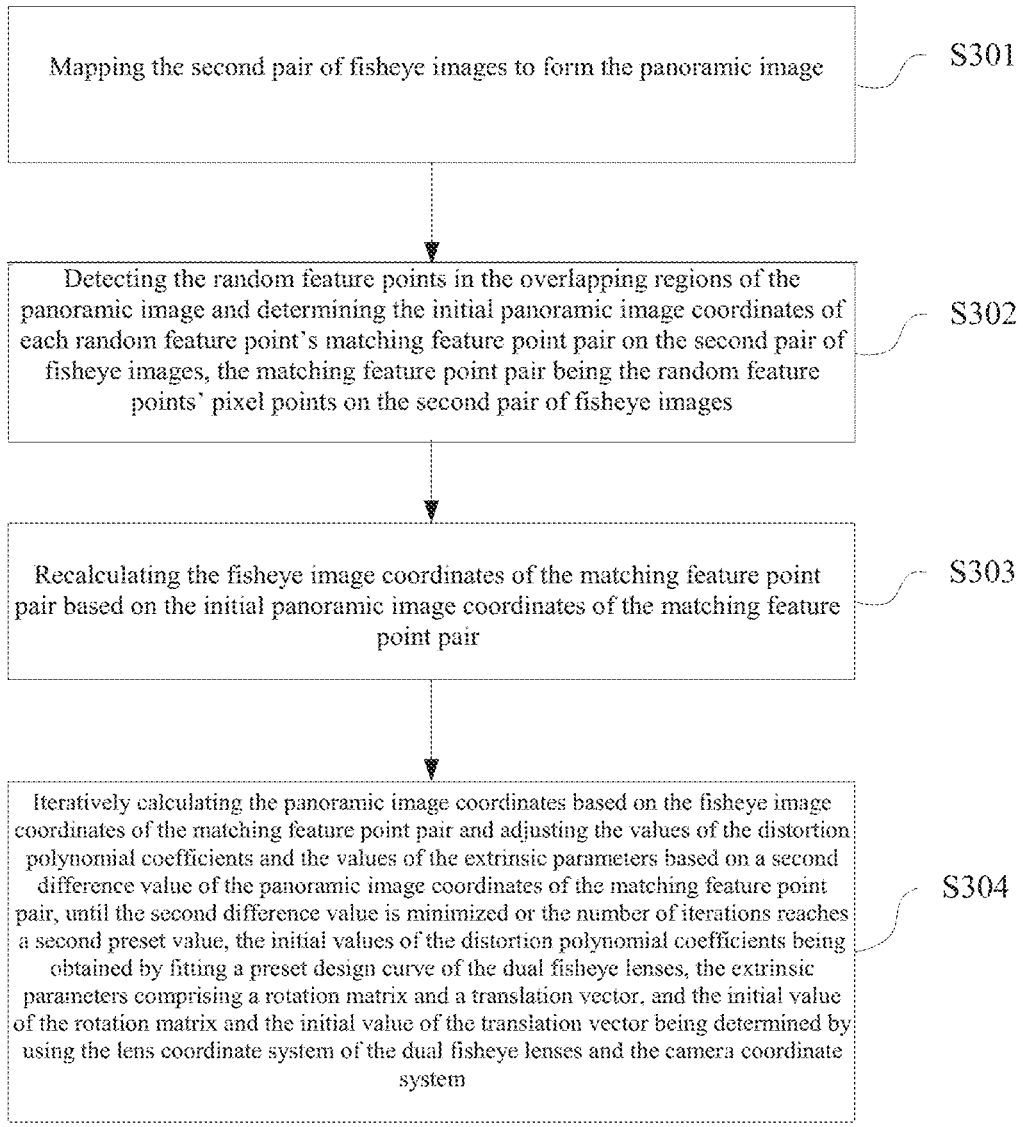
FIG. 3 is a partial flowchart of a method for calibrating a dual-fisheye-lens panoramic camera, in accordance with an exemplary embodiment of the present disclosure.

In another exemplary embodiment of the present disclosure, as illustrated in FIG. 3, Step S105 may include the following steps:

Step S301: mapping the second pair of fisheye images to form the panoramic image;

Step S302: detecting the random feature points in the overlapping regions of the panoramic image and determining the initial panoramic image coordinates of each random feature point's matching feature point pair on the second pair of fisheye images, the matching feature point pair being the random feature points' pixel points on the second pair of fisheye images;

Step S303: recalculating the fisheye image coordinates of the matching feature point pair based on the initial panoramic image coordinates of the matching feature point pair; and Step S304: iteratively calculating the panoramic image coordinates based on the fisheye image coordinates of the matching feature point pair and adjusting the values of the distortion polynomial coefficients and the values of the extrinsic parameters based on a second difference value of the panoramic image coordinates of the matching feature point pair, until the second difference value is minimized or the number of iterations reaches a second preset value, wherein the initial values of the distortion polynomial coefficients are obtained by fitting a preset design curve of the dual fisheye lenses, wherein the extrinsic parameters include a rotation matrix and a translation vector, and wherein the initial value of the rotation matrix and the initial value of the translation vector are determined by using the lens coordinate system of the dual fisheye lenses and the camera coordinate system.

In the exemplary embodiment of the present disclosure, the technical solution provided may update the values of the distortion polynomial coefficients and the values of the extrinsic parameters by means of the panoramic image formed from stitching and projection and the projection error of random feature points in the panoramic image. While ensuring the calibration accuracy for the distortion polynomial coefficients and extrinsic parameters, this technical solution may further ensure the stitching effect of the panoramic image.

In Step S301, the second pair of fisheye images captured by the dual fisheye lenses may be stitched to form the panoramic image. The second pair of fisheye images have overlapping regions in the panoramic image. As described above, random feature point calibration boards are located in the overlapping regions. The overlapping regions may correspond to the edges of the fisheye images; therefore, the random feature points in the overlapping regions may be used to measure the distortion polynomial coefficients. The extrinsic parameters of the camera may be measured by the difference in the coordinates of random feature point pairs in the overlapping regions of the second pair of fisheye images.

Thus, in Step S302, the random feature points in the overlapping regions of the panoramic image may be detected, and the initial panoramic image coordinates of each random feature point's matching feature point pair on the second pair of fisheye images may be determined. The matching feature point pair may be the random feature points' pixel points on the second pair of fisheye images. Specifically, a matching feature point pair may refer to the different pixel points obtained in the second pair of fisheye images from a given random feature point.

In Step S303, on the basis of the initial panoramic image coordinates of the matching feature point pair, its respective fisheye image coordinates in the second pair of fisheye images may be calculated, recorded, and used as input for each subsequent iterative calculation. This value may remain the same.

In Step S304, at each iterative step, the updated values of the distortion polynomial coefficients and extrinsic parameters may be used to calculate new panoramic image coordinates from the fisheye image coordinates of the matching feature point pair (i.e. reprojection is performed with respect to the matching feature point pair only, not the entire image), and the second difference value of the panoramic image coordinates of the matching feature point pair may be calculated. This process may continue until the second difference value is minimized or the number of iterations reaches the second preset value.

Specifically, the distortion polynomial coefficients and extrinsic parameters may affect the second difference value of the matching feature point pair.

More specifically, the second difference value may be calculated using the following formula:

$$\sum_{i}^{m} \sqrt{((x_{front}^{i} - x_{back}^{i})^2 + (y_{front}^{i} - y_{back}^{i})^2)},$$

where m is the number of matching feature point pairs and $p(x_{front}, y_{front})$ and $p(x_{back}, y_{back})$ are the panoramic image coordinates of a matching feature point pair.

In the exemplary embodiment of the present disclosure, the second preset value may be the same as the first preset value, or it may be different from the first preset value.

Figure 4:
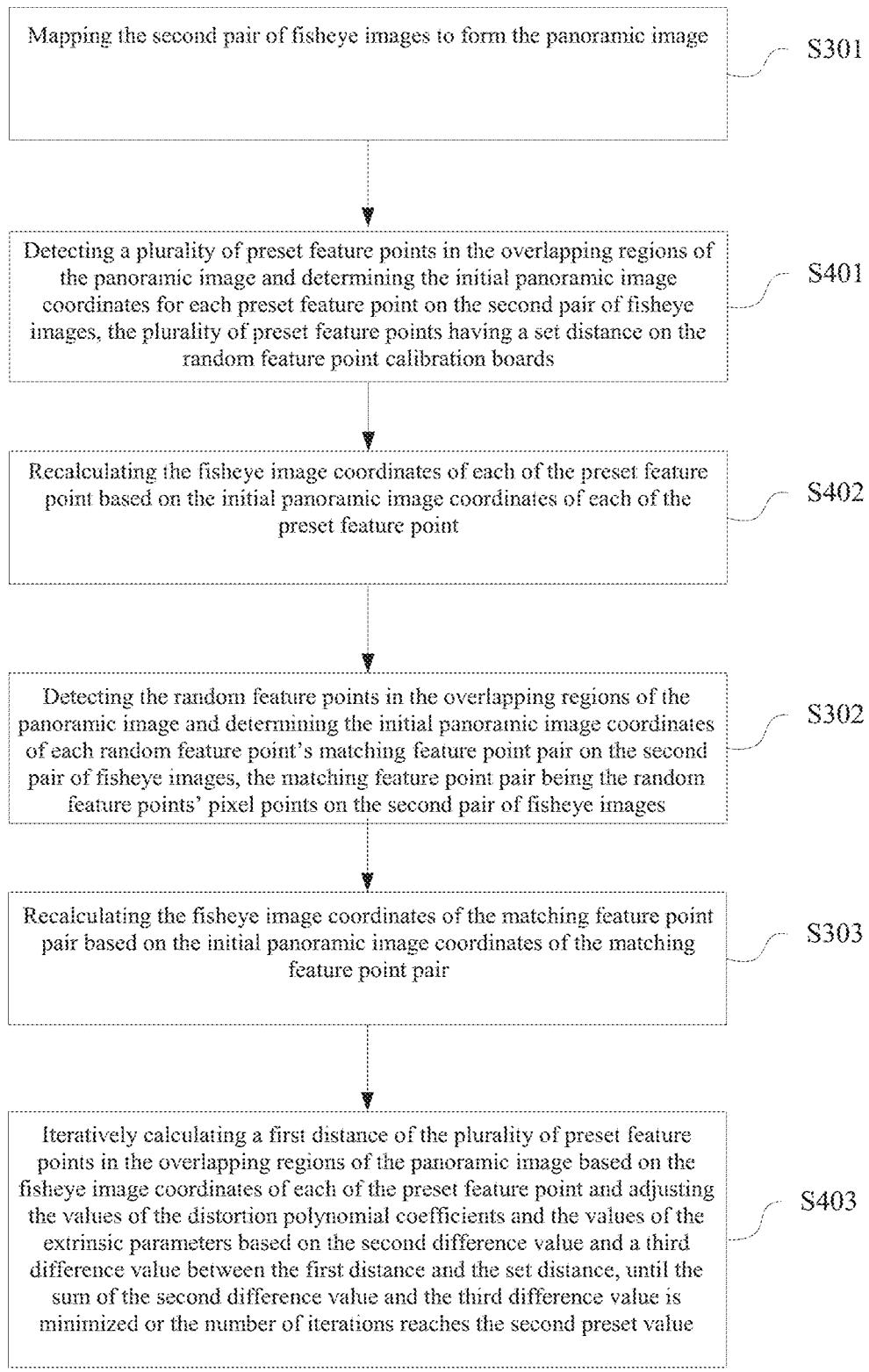
FIG. 4 is a partial flowchart of another method for calibrating a dual fisheye lens panoramic camera, in accordance with an exemplary embodiment of the present disclosure.

Further, referring to FIG. 4, prior to the Step S302 illustrated in FIG. 3, the method may further include the following steps:

Step S401: detecting a plurality of preset feature points in the overlapping regions of the panoramic image and determining the initial panoramic image coordinates for each preset feature point on the second pair of fisheye images, the plurality of preset feature points having a set distance on the random feature point calibration boards; and Step S402: recalculating the fisheye image coordinates of each the preset feature point based on the initial panoramic image coordinates of each the preset feature point;

Step S304 may include the following step: Step S403, iteratively calculating a first distance of the plurality of preset feature points in the overlapping regions of the panoramic image based on the fisheye image coordinates of each the preset feature point and adjusting the values of the distortion polynomial coefficients and the values of the extrinsic parameters on the basis of the second difference value and a third difference value between the first distance and the set distance, until the sum of the second difference value and the third difference value is minimized or the number of iterations reaches the second preset value.

The random feature point calibration boards may further have preset feature points, the preset feature points having a set distance on the random feature point calibration boards. The values of the distortion polynomial coefficients may be updated using the projection error between the distance of the preset feature points in the panoramic image and the set distance. While ensuring the calibration accuracy for the distortion polynomial coefficients, this may further ensure the stitching effect of the panoramic image.

In Step S401, the preset feature points in the overlapping regions of the panoramic image may be detected, and the initial panoramic image coordinates of the preset feature points may be determined. In Step S402, the fisheye image coordinates of the preset feature points on the fisheye images may be calculated using the initial panoramic image coordinates of the preset feature points.

During Step S403, the third difference value between the first distance of the preset feature points and the set distance may be calculated, and the second difference value of the panoramic image coordinates of the matching feature point pair and the third difference value may be used together to determine the direction and size of adjustment to the values of the distortion polynomial coefficients and the values of the extrinsic parameters, and such adjustment may be made. This process may continue until the sum of the second difference value and the third difference value is minimized or the number of iterations reaches the second preset value.

In one embodiment, the distortion polynomial coefficients may affect the first distance of the preset feature points, which in turn may affect the third difference value.

Specifically, the panoramic image coordinates $p(x_r, x_r)$ of the preset feature points may be mapped to a world coordinate system $p_w(x_{rw}, x_{rw})$ to calculate the first distance and the third difference value.

More specifically, the condition for stopping the iterative process may be met when the following equation yields a minimum value:

$$\sum_{i}^{m} \sqrt{((x^i_{front} - x^i_{back})^2 + (y^i_{front} - y^i_{back})^2)} + \sum_{i}^{s/2} \left( \sqrt{((x^i_{rw} - x^{i+s/2}_{rw})^2 + (y^i_{rw} - y^{i+s/2}_{rw})^2)} - d \right),$$

where m is the number of matching feature point pairs, s is the number of preset feature points, and d is the actual distance between the preset feature points.

Understandably, the sum of the second difference value and the third difference value may be minimized when, as the values of the distortion polynomial coefficients and the values of the extrinsic parameters change, the sum of the second difference value and the third difference value decreases no further.

In an embodiment of the present disclosure, the sum of the second difference value and the third difference value may be set to be a optimization target, the values of the distortion polynomial coefficients and the values of the extrinsic parameters may be set to be optimization variables, and the optimal distortion polynomial coefficients and the optimal extrinsic parameters may be determined using the Levenberg-Marquardt algorithm.

In an exemplary embodiment, through the configuration of the optimization target and optimization variables, the optimal distortion polynomial coefficients and the optimal extrinsic parameters may be calculated using the Levenberg-Marquardt algorithm. When the Levenberg-Marquardt algorithm is used, the partial derivative function of the optimization target (which may also be referred to as the objective function) with respect to the optimization variable may not need to be explicitly indicated. Rather, the computational load may be reduced through approximation by finite difference.

In an exemplary embodiment, change in the objective function may be observed as small changes are made to the optimization variable in order to approximate the partial derivative and determine the direction and size of change to the optimization variables. The specific process of performing optimization using the Levenberg-Marquardt algorithm may include the following steps:

Step "a", obtaining the initial values of the distortion polynomial coefficients K1 and K2 by fitting a lens design curve, and determining the initial values of the extrinsic parameters R1, T1, R2, and T2 based on the camera's design parameters, wherein the optical axes of the two fisheye lenses coincide and are in opposite directions and the distance between the lenses is the camera width;

Step "b", detecting the random feature point pairs and preset feature points of the random feature point calibration boards on the panoramic image, and determining, respectively, their fisheye image coordinates on the fisheye images;

Step "c", based on the fisheye image coordinates, calculating the panoramic image coordinates of the random feature point pairs on the panoramic image and the second difference value, and calculating the panoramic image coordinates of the preset feature points on the panoramic image and the third difference value between the first distance of the preset feature points and the set distance;

Step "d", changing the values of the distortion polynomial coefficients K1 and K2 and the values of the extrinsic parameters R1, T1, R2, and T2, and repeating Step "c", to determine the size and direction of change that needs to be made to the values of the distortion polynomial coefficients K1 and K2 and the values of the extrinsic parameters R1, T1, R2, and T2; and Step "e", iteratively executing Step "b" and Step "c" until the sum of the second difference value and the third difference value decreases no further or the number of iterations reaches the second preset value.

In a preferred embodiment of the present disclosure, Step S105 illustrated in FIG. 1 may include the following steps: based on the difference between the panoramic image coordinates of the random features points of the random feature point calibration boards on the second pair of fisheye images, adding control points within a set angle range centered around a 90 degree field of view to the initial distortion curve and adjusting the pixel amplitude of the control points, and determining the optimal distortion polynomial coefficients by fitting the adjusted distortion curve.

The exemplary embodiment may provide a way for determining the distortion polynomial coefficients. In other words, the positions of the distortion curve control points may be changed to obtain a new distortion curve and obtain the distortion polynomial coefficients through fitting.

In an exemplary embodiment, the positions of the control points of the fisheye lens distortion curve may be distributed evenly to the left and right of the 90 degree field of view, and the amplitude of change in the control points may follow a Gaussian distribution. Thus, after a new curve is obtained by adding control points, a polynomial curve fitting may be performed to obtain updated distortion polynomial coefficients.

Figure 5:
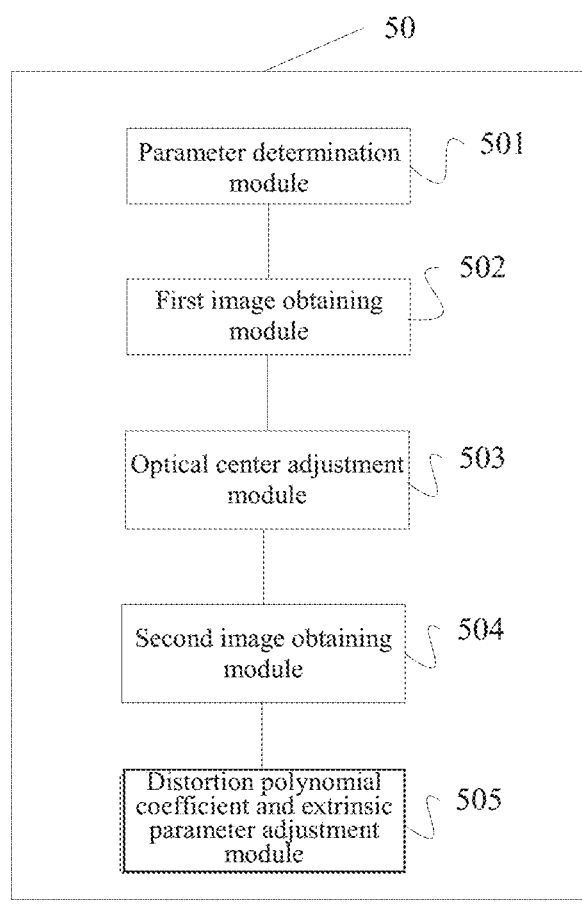
FIG. 5 is a block diagram of a device for calibrating a dual fisheye lens panoramic camera, in accordance with an exemplary embodiment of the present disclosure.

FIG. 5 is a structural diagram illustrating a device for calibrating a dual fisheye lens panoramic camera, in accordance with an exemplary embodiment of the present disclosure.

A calibration device 50 for a dual fisheye lens panoramic camera illustrated in FIG. 5 may include a parameter determination module 501, a first image obtaining module 502, an optical center adjustment module 503, a second image obtaining module 504, and a distortion polynomial coefficient and extrinsic parameter adjustment module 505.

Here, the parameter determination module 501 may be configured to determine intrinsic parameters and extrinsic parameters to be calibrated, and the intrinsic parameters may include optical centers and distortion polynomial coefficients.

The first image obtaining module 502 may be configured to obtain a first pair of fisheye images photographed by dual fisheye lenses, and the first pair of fisheye images may capture calibration chessboards and random feature point calibration boards. The calibration chessboards may respectively be located directly in front of the dual fisheye lenses, and the random feature point calibration boards may respectively be located in overlapping regions of the dual fisheye lenses.

The optical center adjustment module 503 may be configured to adjust the position of the optical centers using the difference between first projection coordinates of the corner points of the calibration chessboards on the first pair of fisheye images and corner point coordinates on the first pair of fisheye images to obtain optimal optical centers.

The second image obtaining module 504 may be configured to update the optical centers of the dual fisheye lenses to be the optimal optical centers and obtain a second pair of fisheye images photographed by the dual fisheye lenses capturing the calibration chessboards and random feature point calibration boards.

The distortion polynomial coefficient and extrinsic parameter adjustment module 505 may be configured to adjust the values of the distortion, polynomial coefficients and the values of the extrinsic parameters using the difference between the panoramic image coordinates of a plurality of random feature points of the random feature point calibration boards on the second pair of fisheye images to obtain optimal distortion polynomial coefficients and optimal extrinsic parameters. The panoramic image may be obtained by mapping and stitching on the basis of the second pair of fisheye images.

In this exemplary embodiment, when the first pair of fisheye images and the second pair of fisheye images capturing the calibration chessboards and random feature point calibration board are being obtained, the calibration chessboards may respectively be located directly in front of the fisheye lenses, and the random feature point calibration boards may respectively be located in overlapping regions of the dual fisheye lenses. The calibration chessboards may only be used to calibrate intrinsic parameters, thus eliminating the need in the currently available technology to frequently move the calibration chessboards or camera, simplifying the operating procedures, and increasing ease of calibration. The random feature point calibration boards may be located in the overlapping regions of the dual fisheye lenses, so that the random feature point calibration boards cover a larger area on the fisheye images, thus ensuring calibration accuracy. Moreover, the requirements for the calibration boards when the extrinsic parameters are being calibrated may be simplified, and feature points on the random feature point calibration boards may be fewer in number, which may reduce the computational load during the calibration process. Further, the technical solution provided by the exemplary embodiments of the present disclosure may first adjust the position of the optical centers using the difference between first projection coordinates of the corner points of the calibration chessboards on the first pair of fisheye images and corner point coordinates on the first pair of fisheye images. Then, the optimal optical centers may be used to capture the second pair of fisheye images to simultaneously adjust the values of the distortion polynomial coefficients and the values of the extrinsic parameters. This may improve the calibration accuracy for the distortion polynomial coefficients along the edges of the images and may further prevent the extrinsic parameters from being affected when currently available technology cannot effectively assess the distortion polynomial coefficients, thus improving the calibration accuracy for fisheye lenses.

In a preferred exemplary embodiment of the present disclosure, the optical center adjustment module 503 may include an optical center iterative adjustment unit configured to adjust the position of the optical center iteratively based on a first difference value between the first projection coordinates and the corner point coordinates on the first pair of fisheye images, until the first difference value is minimized or the number of iterations reaches a first preset value, the initial position of the optical centers being the center position in each of the first pair of fisheye images.

Further, the optical center adjustment module 503 may set the difference value between the first projection coordinates and the corner point coordinates on the first pair of fisheye images to be an optimization target, may set the position of the optical center to be an optimization variable, and may use the Levenberg-Marquardt algorithm to determine the optimal optical centers.

Figure 6:
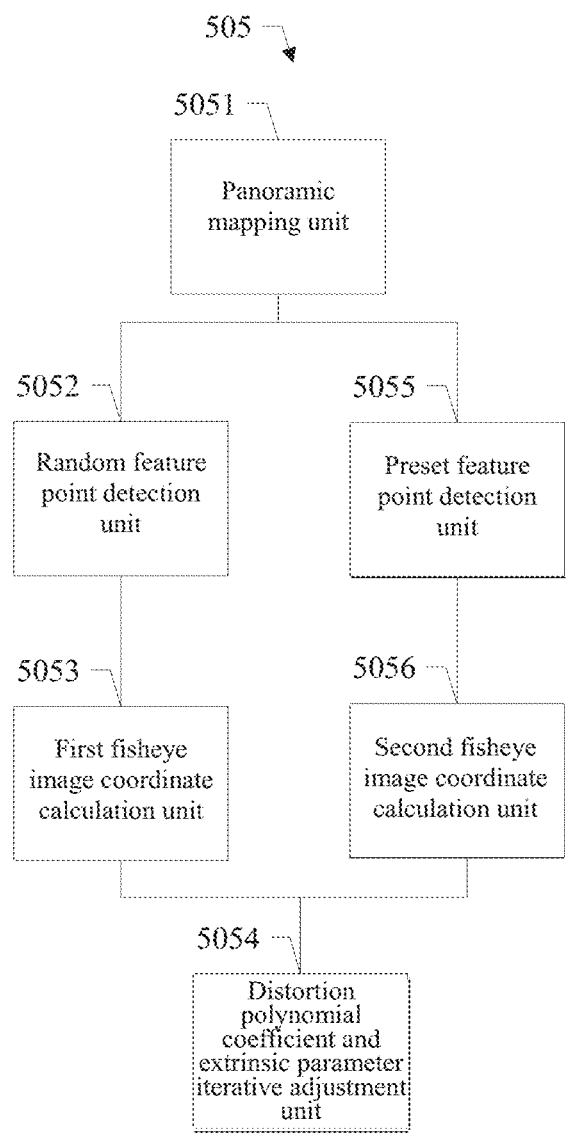
FIG. 6 is a structural diagram illustrating a distortion polynomial coefficient and extrinsic parameter adjustment module 505 illustrated in FIG. 5.

In another preferred exemplary embodiment of the present disclosure, as illustrated in FIG. 6, the distortion polynomial coefficient and extrinsic parameter adjustment module 505 may include:

a panoramic mapping unit 5051 configured to map the second pair of fisheye images to form the panoramic image;

a random feature point detection unit 5052 configured to detect the random feature points in the overlapping regions of the panoramic image and determining the initial panoramic image coordinates of each random feature point's matching feature point pair on the second pair of fisheye images, the matching feature point pair being the random feature points' pixel points on the second pair of fisheye images;

a first fisheye image coordinate calculation unit 5053 configured to recalculate the fisheye image coordinates of the matching feature point pair based on the initial panoramic image coordinates of the matching feature point pair; and a distortion polynomial coefficient and extrinsic parameter iterative adjustment unit 5054 configured to iteratively calculate the panoramic image coordinates based on the fisheye image coordinates of the matching feature point pair and adjust the values of the distortion polynomial coefficients and the values of the extrinsic parameters based on a second difference value of the panoramic image coordinates of the matching feature point pair, until the second difference value is minimized or the number of iterations reaches a second preset value, the initial values of the distortion polynomial coefficients being obtained by fitting a preset design curve of the dual fisheye lenses, the extrinsic parameters including a rotation matrix and a translation vector, and the initial value of the rotation matrix and the initial value of the translation vector being determined by using the lens coordinate system of the dual fisheye lenses and the camera coordinate system.

In an exemplary embodiment of the present disclosure, the values of the distortion polynomial coefficients and the values of the extrinsic parameters may be updated by means of the panoramic image formed from stitching and projection and the projection error of random feature points in the panoramic image. While ensuring the calibration accuracy for the distortion polynomial coefficients and extrinsic parameters, the exemplary embodiments of the present disclosure may further ensure the stitching effect of the panoramic image.

Further, the distortion polynomial coefficient and extrinsic parameter adjustment module 505 may further include:

a preset feature point detection unit 5055 configured to detect a plurality of preset feature points in the overlapping regions of the panoramic image and determine the initial panoramic image coordinates for each preset feature point on the second pair of fisheye images, the plurality of preset feature points having a set distance on the random feature point calibration boards; and a second fisheye image coordinate calculation unit 5056 configured to recalculate the fisheye image coordinates of each the preset feature point on the basis of the initial panoramic image coordinates of each the preset feature point.

The distortion polynomial coefficient and extrinsic parameter iterative adjustment unit 5054 may iteratively calculate a first distance of the plurality of preset feature points in the overlapping regions of the panoramic image based on the fisheye image coordinates of each the preset feature point and may adjust the values of the distortion polynomial coefficients and the values of the extrinsic parameters based on the second difference value and a third difference value between the first distance and the set distance, until the sum of the second difference value and the third difference value is minimized or the number of iterations reaches the second preset value.

Further, the distortion polynomial coefficient and extrinsic parameter iterative adjustment unit 5054 may set the sum of the second difference value and the third difference value to be an optimization target, set the values of the distortion polynomial coefficients and the values of the extrinsic parameters as the optimization variables, and use the Levenberg-Marquardt algorithm to determine the optimal distortion polynomial coefficients and the optimal extrinsic parameters.

In a preferred exemplary embodiment of the present disclosure, the distortion polynomial coefficient and extrinsic parameter adjustment module 505 may include:

a distortion curve adjustment unit configured to, based on the difference between the panoramic image coordinates of the random features points of the random feature point calibration boards on the second pair of fisheye images, add control points within a set angle range centered around a 90-degree field of view to the initial distortion curve and adjust the pixel amplitude of the control points; and an optimal distortion polynomial coefficient determination unit configured to determine the optimal distortion polynomial coefficients by fitting the adjusted distortion curve.

In another exemplary embodiment of the present disclosure, a non-transitory computer-readable medium storing instructions that, when executed by a processor, cause the processor to perform the aforementioned steps of the calibration method for a dual fisheye lens panoramic camera illustrated in FIG. 1 through FIG. 4 may be provided. The storage medium may include a ROM, a RAM, a magnetic disk, or an optical disc, etc. The storage medium may further include a non-volatile storage device or a non-transitory storage device, etc.

One example embodiment of the present invention further discloses a terminal including a storage device storing instructions that, when executed by a processor, cause the processor to perform the steps of the calibration method for a dual fisheye lens panoramic camera illustrated in FIGS. 1 through 4 may be provided. The terminal may include, but is not limited to, a cell phone, a computer, a tablet, or another terminal device.

Notwithstanding the above disclosure, the exemplary embodiments of the present disclosure may not be limited thereby. Any person having ordinary skill in the art may make various alterations and changes that are not detached from the essence and scope of the exemplary embodiments of the present disclosure. Therefore, the scope of protection for the exemplary embodiments of the present disclosure should be that as defined by the claims.

What is claimed is:

1. A computer-implemented method for calibrating a dual fisheye lens that includes two fisheye lenses, the method comprising:

determining intrinsic parameters and extrinsic parameters to be calibrated, the intrinsic parameters comprising optical centers of the two fisheye lenses and distortion polynomial coefficients of the two fisheye lenses;

generating a first pair of fisheye images through the two fisheye lenses, respectively, wherein the first pair of images captures:

two calibration chessboards located directly in front of the two fisheye lenses, respectively, and one or more random feature point calibration boards located in overlapping regions of the two fisheye lenses, wherein each of the two calibration chessboards shows a plurality of corner points, and each of the one or more random feature point calibration boards shows a plurality of random feature points;

adjusting positions of the optical centers based on differences between coordinates of projections of the corner points on fisheye images and coordinates of images of the corner points on the first pair of fisheye images, to obtain optimal optical centers of the two fisheye lenses;

generating a second pair of fisheye images through the two fisheye lenses, respectively, based on the optimal optical points, wherein the second pair of fisheye images captures the two calibration chessboards and the one or more random feature point calibration boards;

generating a panoramic image based on the second pair of fisheye images;

determining a matching feature point pair that are images of a same random feature point on the second pair of fisheye images, respectively; and adjusting values of the distortion polynomial coefficients and values of the extrinsic parameters based on a difference between panoramic-image coordinates of the matching feature point pair, to obtain optimal distortion polynomial coefficients and optimal extrinsic parameters.

2. The method of claim 1, wherein the adjusting the positions of the optical centers based on the differences between the coordinates of projections of the corner points on fisheye images and the coordinates of images of the corner points on the first pair of fisheye images further comprises:
setting initial positions of the optical centers to be at centers of the first pair of fisheye images, respectively; and
adjusting the positions of the optical centers iteratively based on difference values between the coordinates of the projections of the corner points on fisheye images and the coordinates of the images of the corner points on the first pair of fisheye images, until the difference values are reduced to a predetermined value or the adjusting reaches a predetermined number of iterations.

3. The method of claim 1, wherein the adjusting positions of the optical centers based on differences between coordinates of projections of the corner points on fisheye images and the coordinates of images of the corner points on the first pair of fisheye images further comprises:
in a Levenberg-Marquardt algorithm, setting difference values between the coordinates of the projections of the corner points on the first pair of fisheye images and the coordinates of the images of the corner points on the first pair of fisheye images to be optimization targets, and setting the positions of the optical center to be optimization variables; and
using the Levenberg-Marquardt algorithm to determine positions of the optimal optical centers.

4. The method of claim 1, wherein the adjusting the values of the distortion polynomial coefficients and the values of the extrinsic parameters based on the difference between the panoramic-image coordinates of the matching feature point pair further comprises:
matching the second pair of fisheye images to generate the panoramic image;
detecting the random feature point in an overlapping region of the panoramic image and determining initial panoramic-image coordinates of the matching feature point pair;
calculating fisheye-image coordinates of the matching feature point pair, based on the initial panoramic-image coordinates of the matching feature point pair; and
performing an iteration including:
calculating the panoramic-image coordinates of the matching feature point pair based on the fisheye-image coordinates of the matching feature point pair, and
adjusting the values of the distortion polynomial coefficients and the values of the extrinsic parameters based on a first difference value of the panoramic-image coordinates of the matching feature point pair, until the first difference value is reduced to a first predetermined value or the iteration is performed for a first predetermined number of times,
wherein initial values of the distortion polynomial coefficients used for the iteration are determined by fitting a preset design curve of the dual fisheye lens, and initial values of the extrinsic parameters are determined by based on an coordinate system associated with the dual fisheye lens and an coordinate system associated with a camera using the dual fisheye lens, the extrinsic parameters comprising a rotation matrix and a translation vector.

5. The method of claim 4, wherein, prior to the detecting the random feature point in the overlapping region of the panoramic image and determining the initial panoramic-image coordinates of the matching feature point pair, the method further comprises:
detecting a pair of preset feature points in the overlapping region of the panoramic image and determining initial panoramic-image coordinates of the pair of preset feature points, the pair of preset feature points being separated by a preset distance on the one or more random feature point calibration board; and
calculating fisheye-image coordinates of the pair of preset feature points based on the initial panoramic-image coordinates of the pair of preset feature points;
wherein the iteration further includes:
calculating a first distance of the pair of preset feature points based on the fisheye-image coordinates of the pair of preset feature points;
determining a second difference value of the first distance and the preset distance, and
adjusting the values of the distortion polynomial coefficients and the values of the extrinsic parameters based on the first difference value and the second difference value, until a sum of the first difference value and the second difference value is reduced to a second predetermined value or the iteration is performed for a second predetermined number of times.

6. The method of claim 5, wherein the adjusting the values of the distortion polynomial coefficients and the values of the extrinsic parameters based on the difference between the panoramic-image coordinates of the matching feature point pair further comprises:
in a Levenberg-Marquardt algorithm, setting the sum of the first difference value and the second difference value to be an optimization target, and setting the values of the distortion polynomial coefficients and the values of the extrinsic parameters to be optimization variables; and
using the Levenberg-Marquardt algorithm to determine the optimal distortion polynomial coefficients and the optimal extrinsic parameters.

7. The method of claim 1, wherein the adjusting the values of the distortion polynomial coefficients and the values of the extrinsic parameters based on the difference between the panoramic-image coordinates of the matching feature point pair further comprises:
based on the difference between the panoramic-image coordinates of the matching feature point pair, adding control points, within a preset angle range centered around a 90-degree angle of view of the dual fisheye lens, to a distortion curve of the dual fisheye lens and adjusting pixel values of the added control points; and
determining the optimal distortion polynomial coefficients by fitting the distortion curve.

8. A device for calibrating a dual fisheye lens that includes two fisheye lenses, the device comprising:
a memory storing instructions; and
a processor configured to execute the instructions to:
determine intrinsic parameters and extrinsic parameters to be calibrated, the intrinsic parameters comprising optical centers of the two fisheye lenses and distortion polynomial coefficients of the two fisheye lenses;

generate a first pair of fisheye images through the two fisheye lenses, respectively, wherein the first pair of images captures:
two calibration chessboards located directly in front of the two fisheye lenses, respectively, and
one or more random feature point calibration boards located in overlapping regions of the two fisheye lenses,
wherein each of the two calibration chessboards shows a plurality of corner points, and each of the one or more random feature point calibration boards shows a plurality of random feature points;

adjust positions of the optical centers based on differences between coordinates of projections of the corner points on fisheye images and coordinates of images of the corner points on the first pair of fisheye images, to obtain optimal optical centers of the two fisheye lenses;

generate a second pair of fisheye images through the two fisheye lenses, respectively, based on the optimal optical points, wherein the second pair of fisheye images captures the two calibration chessboards and the one or more random feature point calibration boards;

generate a panoramic image based on the second pair of fisheye images;

determine a matching feature point pair that are images of a same random feature point on the second pair of fisheye images, respectively; and adjust values of the distortion polynomial coefficients and values of the extrinsic parameters based on a difference between panoramic-image coordinates of the matching feature point pair, to obtain optimal distortion polynomial coefficients and optimal extrinsic parameters.

9. The device of claim 8, wherein the processor is further configured to execute the instructions to:
set initial positions of the optical centers to be at centers of the first pair of fisheye images, respectively; and
adjust the positions of the optical centers iteratively based on difference values between the coordinates of the projections of the corner points on fisheye images and the coordinates of the images of the corner points on the first pair of fisheye images, until the difference values are reduced to a predetermined value or the adjusting reaches a predetermined number of iterations.

10. The device of claim 8, wherein the processor is further configured to execute the instructions to:
in a Levenberg-Marquardt algorithm, set difference values between the coordinates of the projections of the corner points on the first pair of fisheye images and the coordinates of the images of the corner points on the first pair of fisheye images to be optimization targets, and set the positions of the optical center to be optimization variables; and
use the Levenberg-Marquardt algorithm to determine positions of the optimal optical centers.

11. The device of claim 8, wherein the processor is further configured to execute the instructions to:
match the second pair of fisheye images to generate the panoramic image;

detect the random feature point in an overlapping region of the panoramic image and determine initial panoramic-image coordinates of the matching feature point pair;

calculate fisheye-image coordinates of the matching feature point pair, based on the initial panoramic-image coordinates of the matching feature point pair; and perform an iteration including:
calculating the panoramic-image coordinates of the matching feature point pair based on the fisheye-image coordinates of the matching feature point pair, and
adjusting the values of the distortion polynomial coefficients and the values of the extrinsic parameters based on a first difference value of the panoramic-image coordinates of the matching feature point pair, until the first difference value is reduced to a first predetermined value or the iteration is performed for a first predetermined number of times,
wherein initial values of the distortion polynomial coefficients used for the iteration are determined by fitting a preset design curve of the dual fisheye lens, and initial values of the extrinsic parameters are determined by based on an coordinate system associated with the dual fisheye lens and an coordinate system associated with a camera using the dual fisheye lens, the extrinsic parameters comprising a rotation matrix and a translation vector.

12. The device of claim 11, wherein the processor is further configured to execute the instructions:
detect a pair of preset feature points in the overlapping region of the panoramic image and determine initial panoramic-image coordinates of the pair of preset feature points, the pair of preset feature points being separated by a preset distance on the one or more random feature point calibration board; and
calculate fisheye-image coordinates of the pair of preset feature points based on the initial panoramic-image coordinates of the pair of preset feature points;
wherein the iteration further includes:
calculating a first distance of the pair of preset feature points based on the fisheye-image coordinates of the pair of preset feature points,
determining a second difference value of the first distance and the preset distance, and
adjusting the values of the distortion polynomial coefficients and the values of the extrinsic parameters based on the first difference value and the second difference value, until a sum of the first difference value and the second difference value is reduced to a second predetermined value or the iteration is performed for a second predetermined number of times.

13. The device of claim 12, wherein the processor is further configured to execute the instructions to:
in a Levenberg-Marquardt algorithm, set the sum of the first difference value and the second difference value to be an optimization target, and set the values of the distortion polynomial coefficients and the values of the extrinsic parameters to be optimization variables; and
use the Levenberg-Marquardt algorithm to determine the optimal distortion polynomial coefficients and the optimal extrinsic parameters.

14. The device of claim 8, wherein the processor is further configured to execute the instructions to:
based on the difference between the panoramic-image coordinates of the matching feature point pair, add control points, within a preset angle range centered around a 90-degree angle of view of the dual fisheye lens, to a distortion curve of the dual fisheye lens and adjusting pixel values of the added control points; and determine the optimal distortion polynomial coefficients by fitting the distortion curve.

15. A non-transitory computer-readable medium comprising instructions that, when executed by a processor, cause the processor to perform a method for calibrating a dual fisheye lens that includes two fisheye lenses, the method comprising:

determining intrinsic parameters and extrinsic parameters to be calibrated, the intrinsic parameters comprising optical centers of the two fisheye lenses and distortion polynomial coefficients of the two fisheye lenses;

generating a first pair of fisheye images through the two fisheye lenses, respectively, wherein the first pair of images captures:
two calibration chessboards located directly in front of the two fisheye lenses, respectively, and
one or more random feature point calibration boards located in overlapping regions of the two fisheye lenses,
wherein each of the two calibration chessboards shows a plurality of corner points, and each of the one or more random feature point calibration boards shows a plurality of random feature points;

adjusting positions of the optical centers based on differences between coordinates of projections of the corner points on fisheye images and coordinates of images of the corner points on the first pair of fisheye images, to obtain optimal optical centers of the two fisheye lenses;

generating a second pair of fisheye images through the two fisheye lenses, respectively, based on the optimal optical points, wherein the second pair of fisheye images captures the two calibration chessboards and the one or more random feature point calibration boards;

generating a panoramic image based on the second pair of fisheye images;

determining a matching feature point pair that are images of a same random feature point on the second pair of fisheye images, respectively; and adjusting values of the distortion polynomial coefficients and values of the extrinsic parameters based on a difference between panoramic-image coordinates of the matching feature point pair, to obtain optimal distortion polynomial coefficients and optimal extrinsic parameters.

16. The medium of claim 15, wherein the adjusting the positions of the optical centers based on the differences between the coordinates of projections of the corner points on fisheye images and the coordinates of images of the corner points on the first pair of fisheye images further comprises:

setting initial positions of the optical centers to be at centers of the first pair of fisheye images, respectively; and adjusting the positions of the optical centers iteratively based on difference values between the coordinates of the projections of the corner points on fisheye images and the coordinates of the images of the corner points on the first pair of fisheye images, until the difference values are reduced to a predetermined value or the adjusting reaches a predetermined number of iterations.

17. The medium of claim 15, wherein the adjusting positions of the optical centers based on differences between coordinates of projections of the corner points on fisheye images and the coordinates of images of the corner points on the first pair of fisheye images further comprises:

in a Levenberg-Marquardt algorithm, setting difference values between the coordinates of the projections of the corner points on the first pair of fisheye images and the coordinates of the images of the corner points on the first pair of fisheye images to be optimization targets, and setting the positions of the optical center to be optimization variables; and using the Levenberg-Marquardt algorithm to determine positions of the optimal optical centers.

18. The medium of claim 15, wherein the adjusting the values of the distortion polynomial coefficients and the values of the extrinsic parameters based on the difference between the panoramic-image coordinates of the matching feature point pair further comprises:

matching the second pair of fisheye images to generate the panoramic image;

detecting the random feature point in an overlapping region of the panoramic image and determining initial panoramic-image coordinates of the matching feature point pair;

calculating fisheye-image coordinates of the matching feature point pair, based on the initial panoramic-image coordinates of the matching feature point pair; and performing an iteration including:
calculating the panoramic-image coordinates of the matching feature point pair based on the fisheye-image coordinates of the matching feature point pair, and
adjusting the values of the distortion polynomial coefficients and the values of the extrinsic parameters based on a first difference value of the panoramic-image coordinates of the matching feature point pair, until the first difference value is reduced to a first predetermined value or the iteration is performed for a first predetermined number of times,
wherein initial values of the distortion polynomial coefficients used for the iteration are determined by fitting a preset design curve of the dual fisheye lens, and initial values of the extrinsic parameters are determined by based on an coordinate system associated with the dual fisheye lens and an coordinate system associated with a camera using the dual fisheye lens, the extrinsic parameters comprising a rotation matrix and a translation vector.

19. The medium of claim 18, wherein, prior to the detecting the random feature point in the overlapping region of the panoramic image and determining the initial panoramic-image coordinates of the matching feature point pair, the method further comprises:

detecting a pair of preset feature points in the overlapping region of the panoramic image and determining initial panoramic-image coordinates of the pair of preset feature points, the pair of preset feature points being separated by a preset distance on the one or more random feature point calibration board; and calculating fisheye-image coordinates of the pair of preset feature points based on the initial panoramic-image coordinates of the pair of preset feature points;

wherein the iteration further includes:
calculating a first distance of the pair of preset feature points based on the fisheye-image coordinates of the pair of preset feature points;
determining a second difference value of the first distance and the preset distance, and adjusting the values of the distortion polynomial coefficients and the values of the extrinsic parameters based on the first difference value and the second difference value, until a sum of the first difference value and the second difference value is reduced to a second predetermined value or the iteration is performed for a second predetermined number of times.

20. The medium of claim 19, wherein the adjusting the values of the distortion polynomial coefficients and the values of the extrinsic parameters based on the difference between the panoramic-image coordinates of the matching feature point pair further comprises:

in a Levenberg-Marquardt algorithm, setting the sum of the first difference value and the second difference value to be an optimization target, and setting the values of the distortion polynomial coefficients and the values of the extrinsic parameters to be optimization variables; and using the Levenberg-Marquardt algorithm to determine the optimal distortion polynomial coefficients and the optimal extrinsic parameters.

\* \* \* \* \*